United States Patent
Kim et al.

(10) Patent No.: US 10,101,818 B2
(45) Date of Patent: Oct. 16, 2018

(54) MOBILE TERMINAL AND METHOD FOR CONTROLLING THE SAME

(71) Applicant: LG ELECTRONICS INC., Seoul (KR)

(72) Inventors: Namki Kim, Seoul (KR); Yeerang Yun, Seoul (KR); Jian Choi, Seoul (KR); Jiyeon Kim, Seoul (KR); Bongjeong Jeon, Seoul (KR); Jongseok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 511 days.

(21) Appl. No.: 14/654,815

(22) PCT Filed: Nov. 25, 2014

(86) PCT No.: PCT/KR2014/011348
§ 371 (c)(1),
(2) Date: Jun. 22, 2015

(87) PCT Pub. No.: WO2015/199292
PCT Pub. Date: Dec. 30, 2015

(65) Prior Publication Data
US 2016/0259420 A1     Sep. 8, 2016

(30) Foreign Application Priority Data
Jun. 26, 2014 (KR) .................. 10-2014-0079262

(51) Int. Cl.
*G06F 3/0487* (2013.01)
*G06F 3/01* (2006.01)
(Continued)

(52) U.S. Cl.
CPC ............ *G06F 3/017* (2013.01); *G06F 1/1626* (2013.01); *G06F 3/033* (2013.01); *G06F 3/0346* (2013.01);
(Continued)

(58) Field of Classification Search
CPC .............................. G06F 3/017; G06F 1/1626
See application file for complete search history.

(56) References Cited

U.S. PATENT DOCUMENTS

2008/0222560 A1* 9/2008 Harrison ............. G06F 3/04847
715/800
2010/0045705 A1* 2/2010 Vertegaal ........... A47G 19/2227
345/661
(Continued)

FOREIGN PATENT DOCUMENTS

| CN | 101640724 | 2/2010 |
|----|-----------|--------|
| CN | 101958968 | 1/2011 |

(Continued)

OTHER PUBLICATIONS

European Patent Office Application Serial No. 14884271.9, Search Report dated Jan. 18, 2017, 7 pages.
(Continued)

*Primary Examiner* — Jennifer N To
*Assistant Examiner* — Ashley M Fortino
(74) *Attorney, Agent, or Firm* — Lee, Hong, Degerman, Kang & Waimey

(57) ABSTRACT

A mobile terminal and a method for controlling the same are disclosed. The mobile terminal and the method for controlling the same according to the present invention can execute a specific function corresponding to at least one shaking operation in consideration of a screen displayed on a display unit, a direction of the shaking operation and the number of times of sensing the shaking operation, upon sensing of the
(Continued)

at least one shaking operation, and display a result screen of executing the specific function. According to the present invention, it is possible to arouse user's interest by providing different screens according to shaking operations of the mobile terminal and to provide user convenience by executing a specific function only by shaking the mobile terminal.

17 Claims, 24 Drawing Sheets

(51) Int. Cl.
    *G06F 3/033* (2013.01)
    *G06F 1/16* (2006.01)
    *G06F 3/0346* (2013.01)
    *G06F 3/041* (2006.01)
    *G06F 3/0482* (2013.01)
    *H04M 1/725* (2006.01)

(52) U.S. Cl.
    CPC .......... *G06F 3/0412* (2013.01); *G06F 3/0482* (2013.01); *H04M 1/725* (2013.01); *H04M 1/72569* (2013.01)

(56) References Cited

U.S. PATENT DOCUMENTS

| | | | |
|---|---|---|---|
| 2013/0185137 A1* | 7/2013 | Shafi | G06Q 30/02 705/14.35 |
| 2013/0185368 A1 | 7/2013 | Nordstrom et al. | |
| 2013/0260795 A1 | 10/2013 | Papakipos et al. | |
| 2014/0113593 A1* | 4/2014 | Zhou | H04L 63/20 455/411 |
| 2014/0132081 A1* | 5/2014 | Lin | H03K 17/94 307/116 |
| 2014/0279530 A1* | 9/2014 | Douglas | G06Q 20/322 705/44 |
| 2014/0372126 A1* | 12/2014 | Ady | G10L 25/48 704/270.1 |

FOREIGN PATENT DOCUMENTS

| | | |
|---|---|---|
| CN | 102135850 | 7/2011 |
| CN | 103294201 | 9/2013 |
| EP | 2144425 | 1/2010 |
| EP | 1728142 | 8/2010 |
| KR | 10-0605457 | 7/2006 |
| KR | 10-2010-0005440 | 1/2010 |
| KR | 10-2012-0077295 | 7/2012 |
| KR | 10-2014-0030963 | 3/2014 |
| KR | 10-2014-0033198 | 3/2014 |

OTHER PUBLICATIONS

European Patent Office Application Serial No. 14884271.9, Search Report dated Feb. 24, 2017, 13 pages.

PCT International Application No. PCT/KR2014/011348, Written Opinion of the International Searching Authority dated Feb. 24, 2015, 1 page.

The State Intellectual Property Office of the People's Republic of China Application Serial No. 201480009324.X, Office Action dated Jul. 27, 2018, 22 pages.

\* cited by examiner

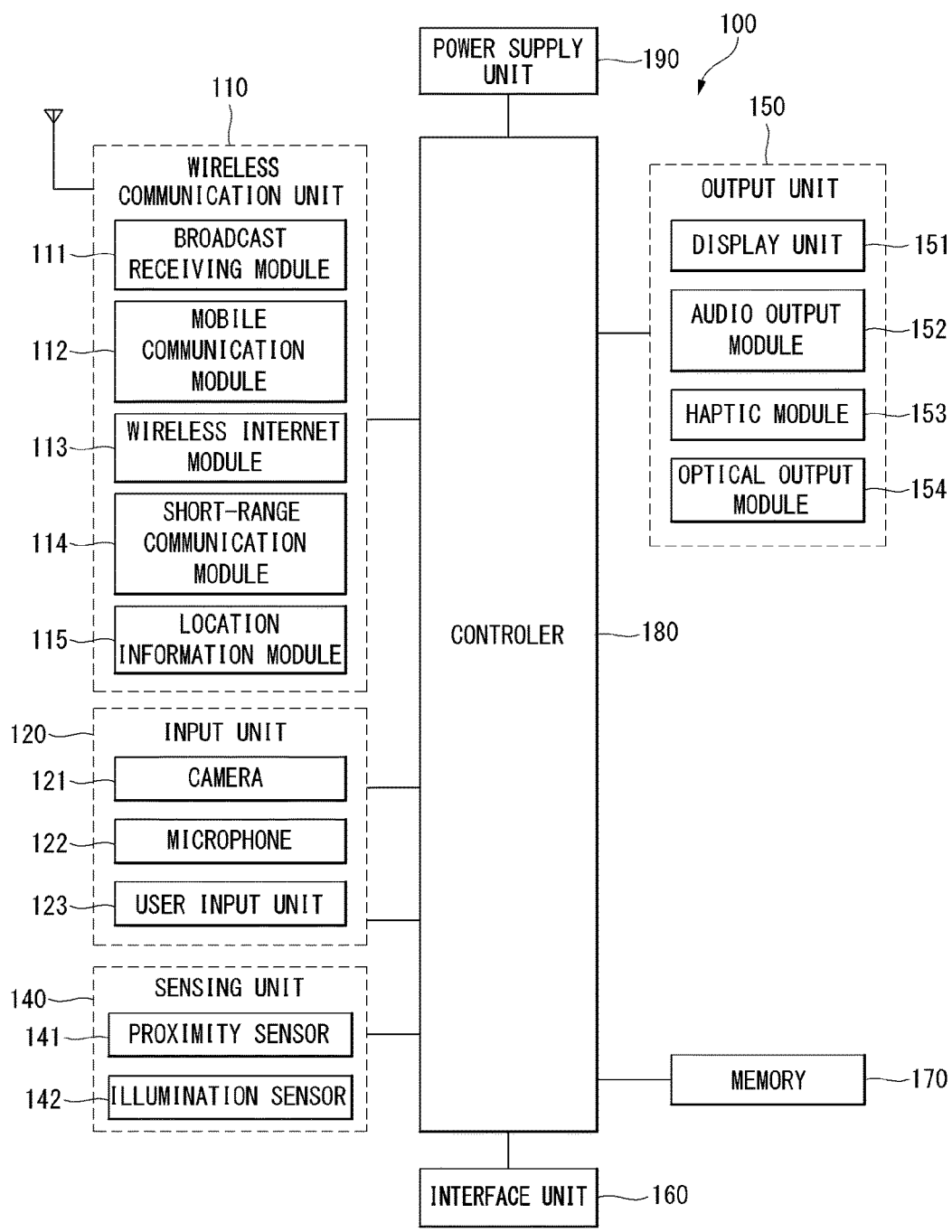

[Figure 1b]
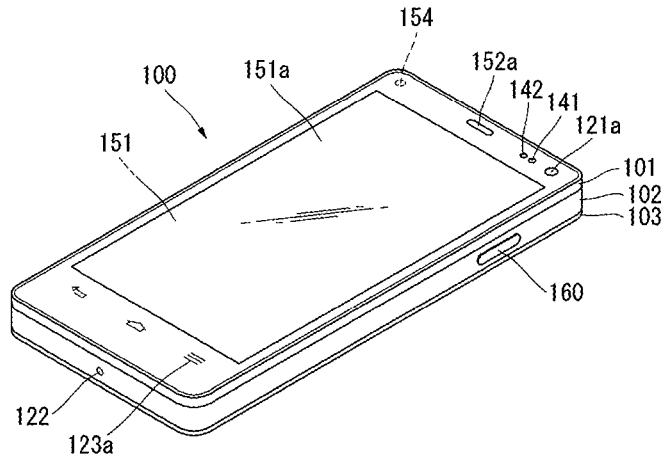
[Figure 1c]
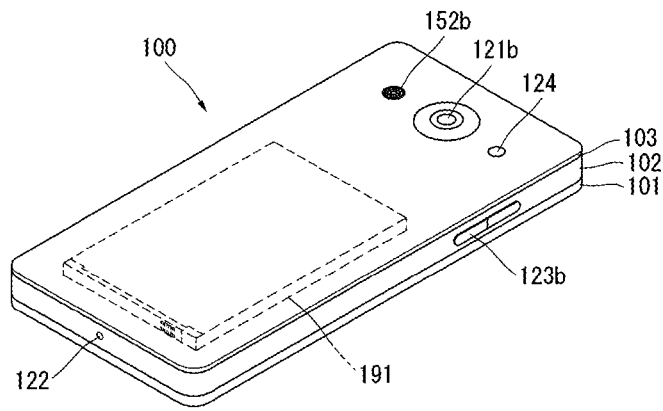
[Figure 2]
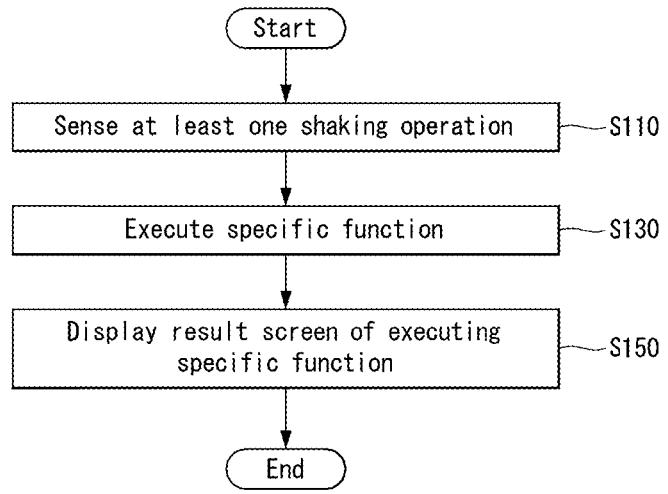

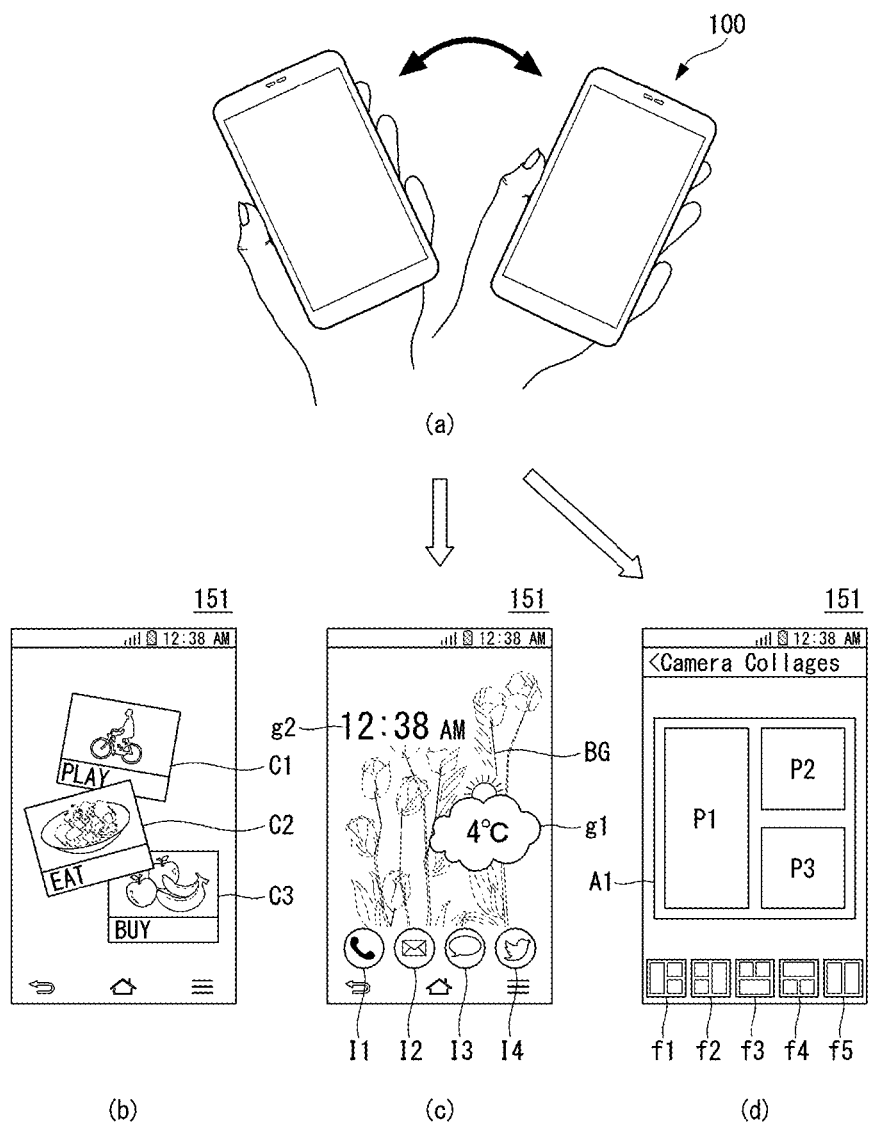
[Figure 3]

[Figure 4]
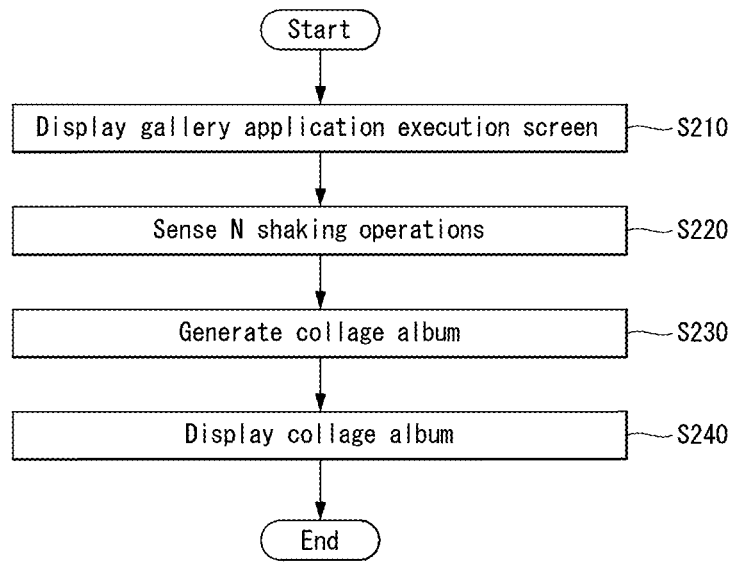
[Figure 5]
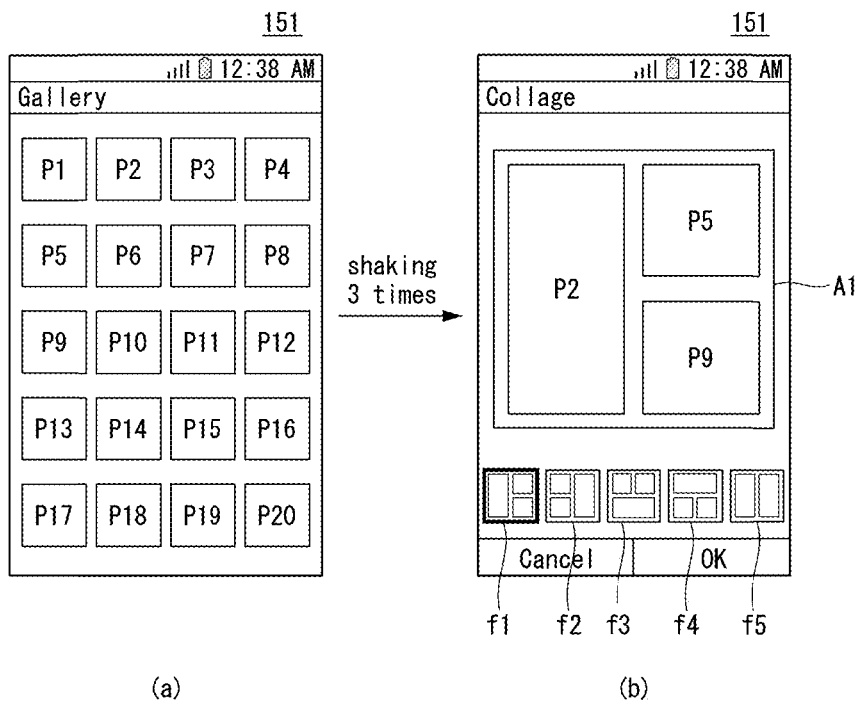
(a)      (b)

[Figure 6]
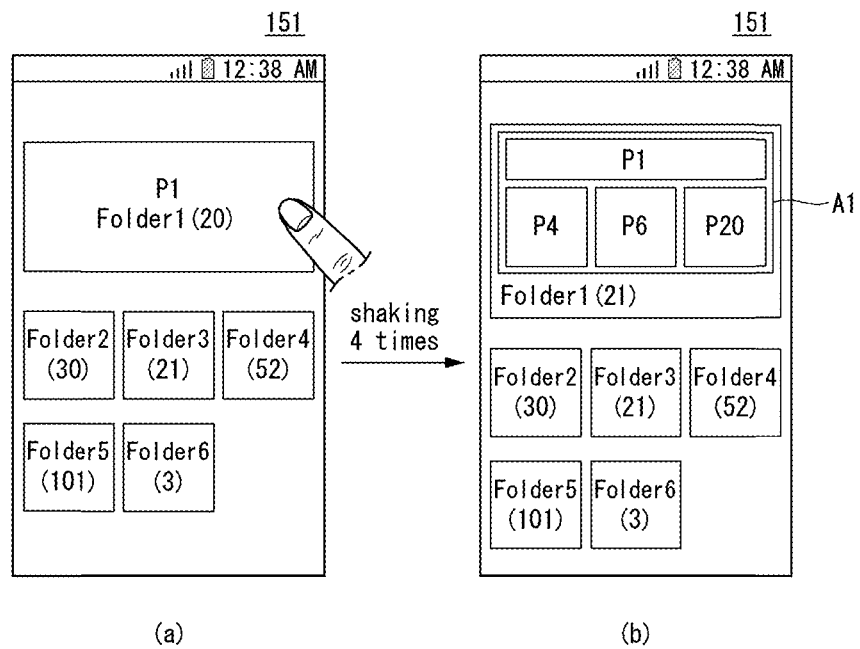
[Figure 7]
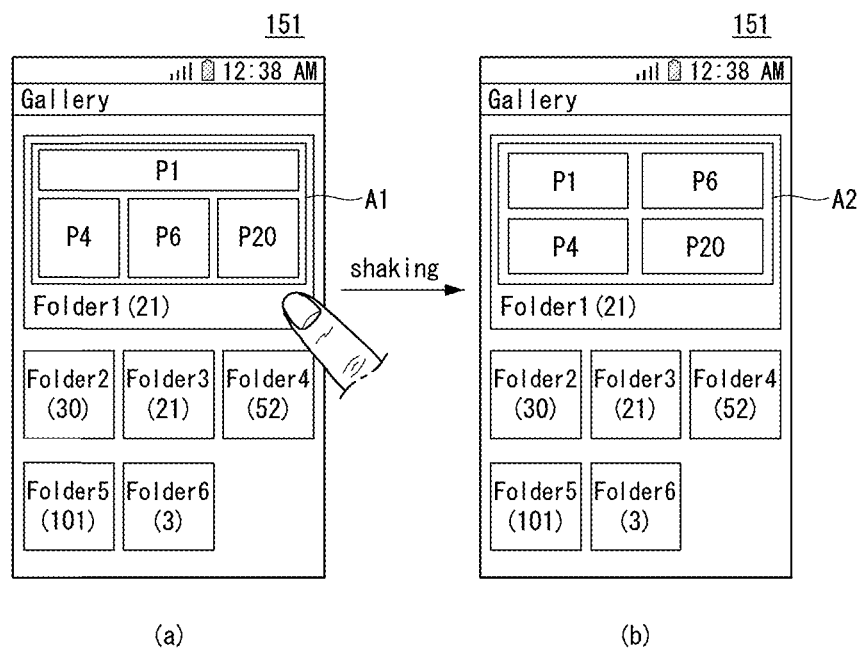

[Figure 8]
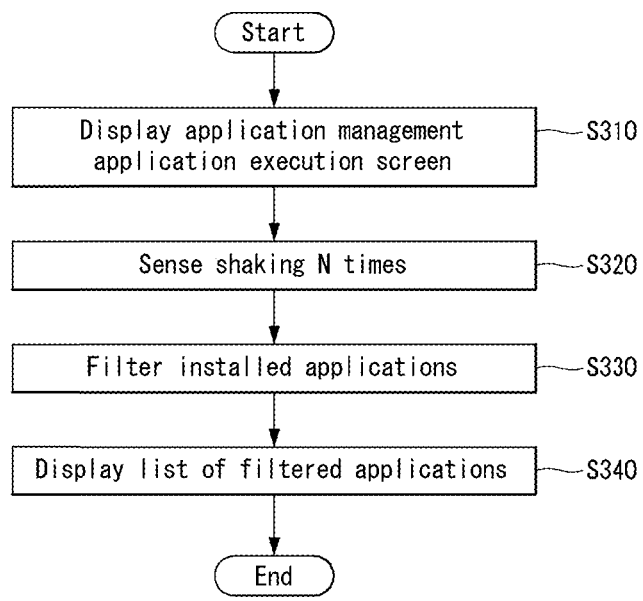

【Figure 9】
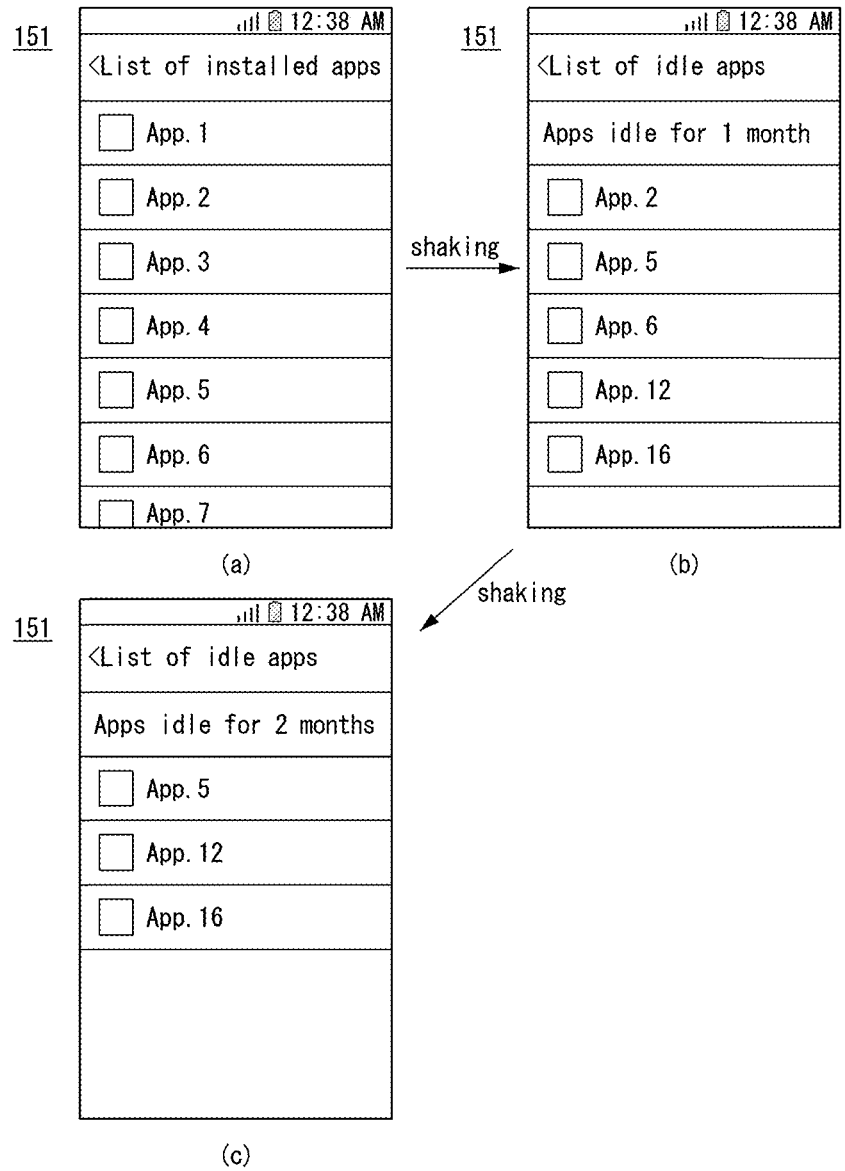

【Figure 10】
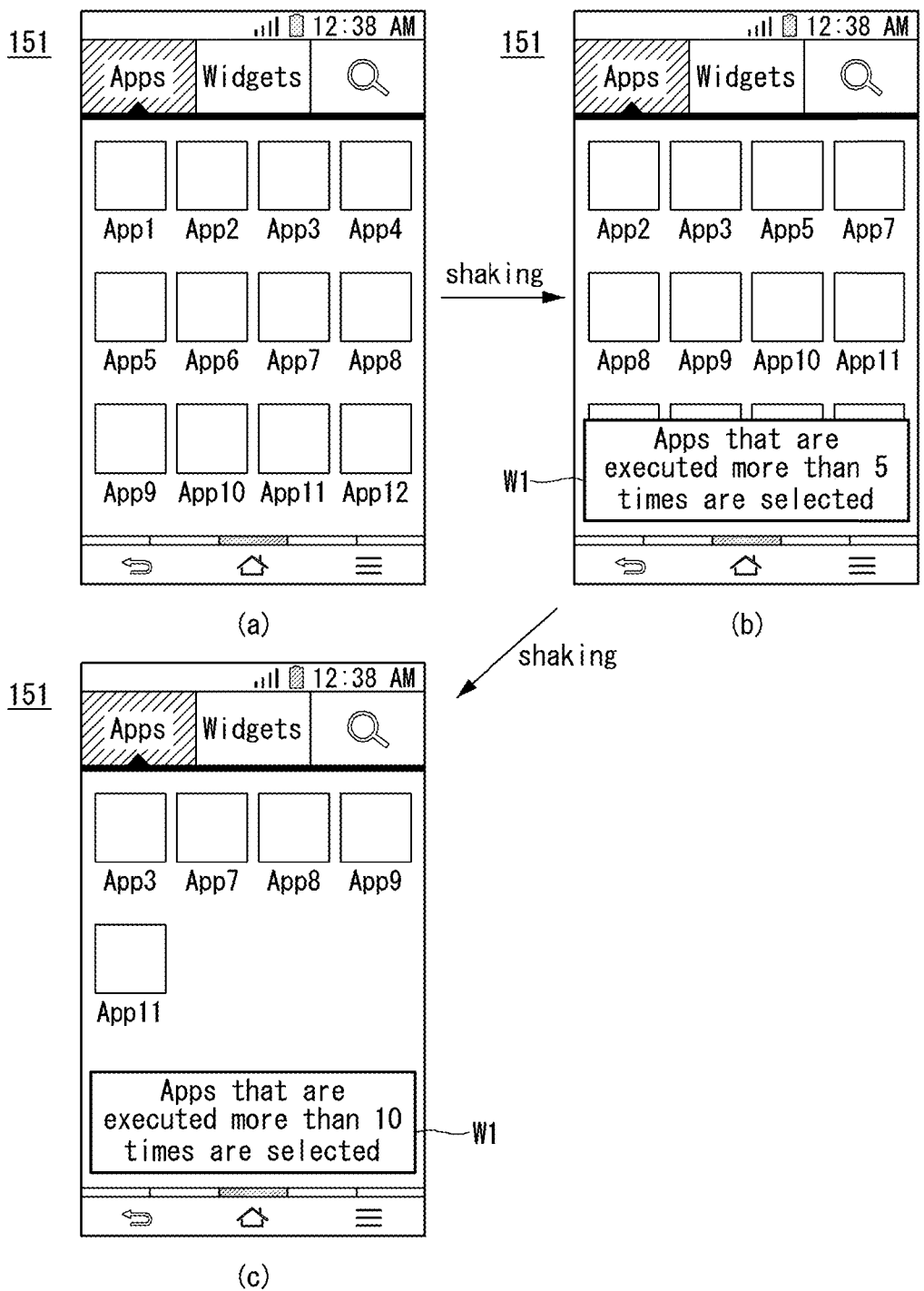

【Figure 11】
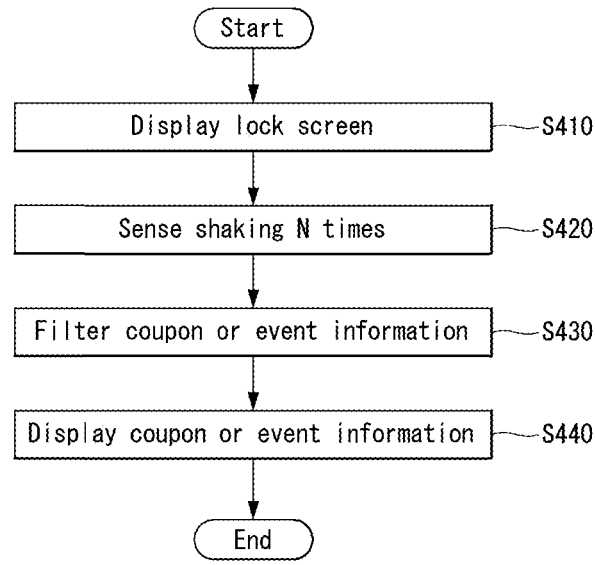
【Figure 12】
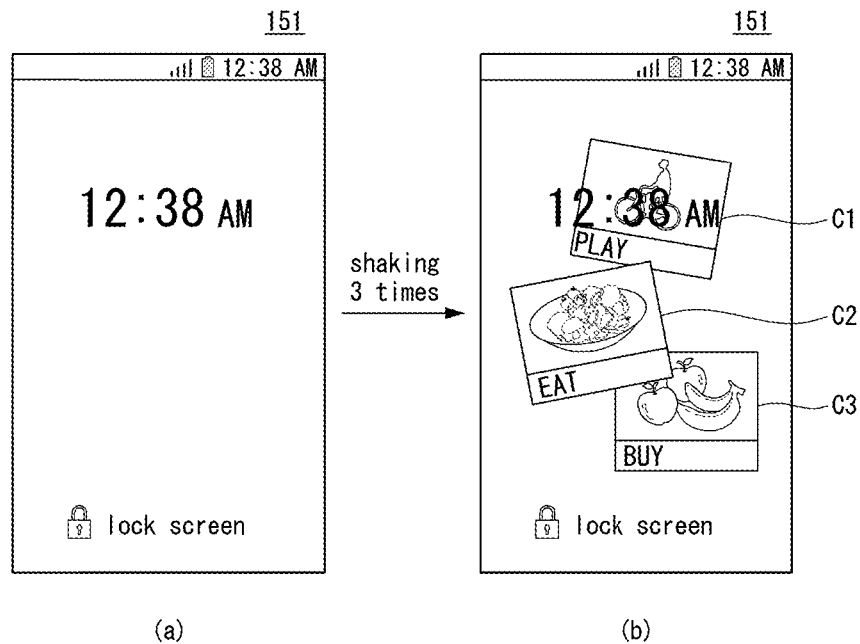

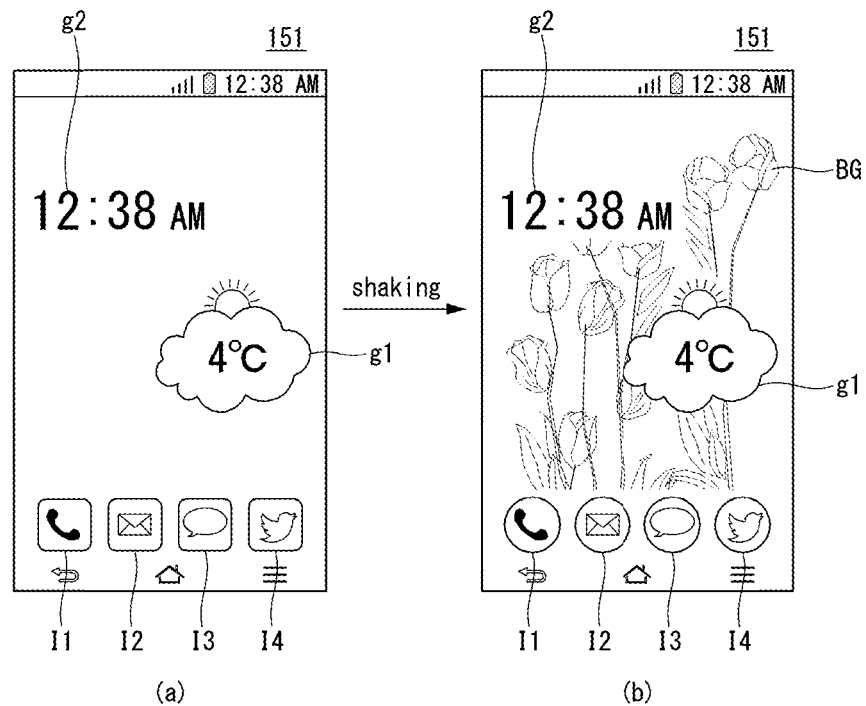
[Figure 13]

【Figure 14】
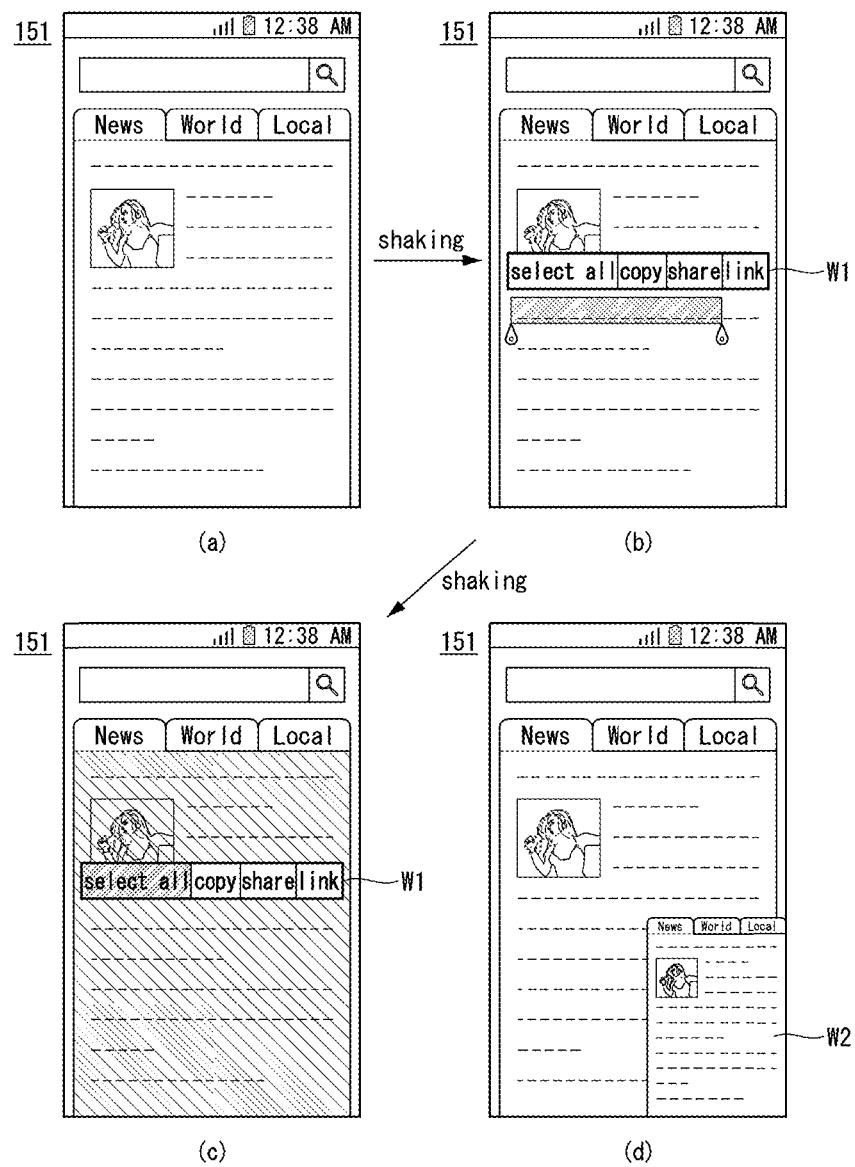

[Figure 15]
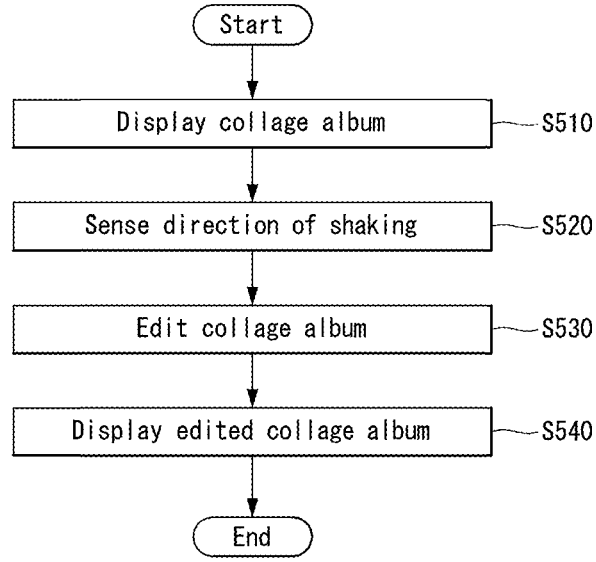
[Figure 16]
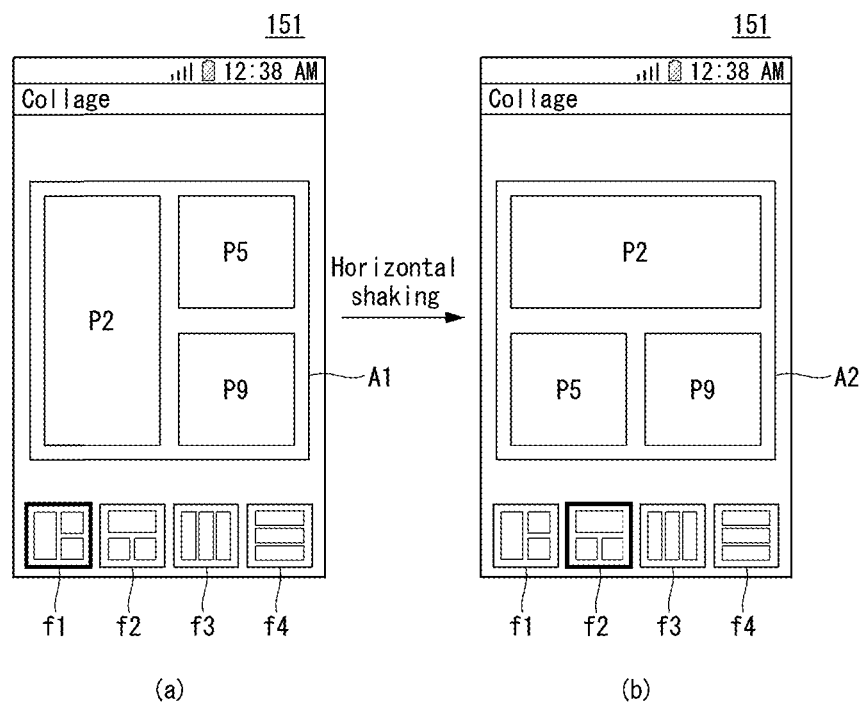

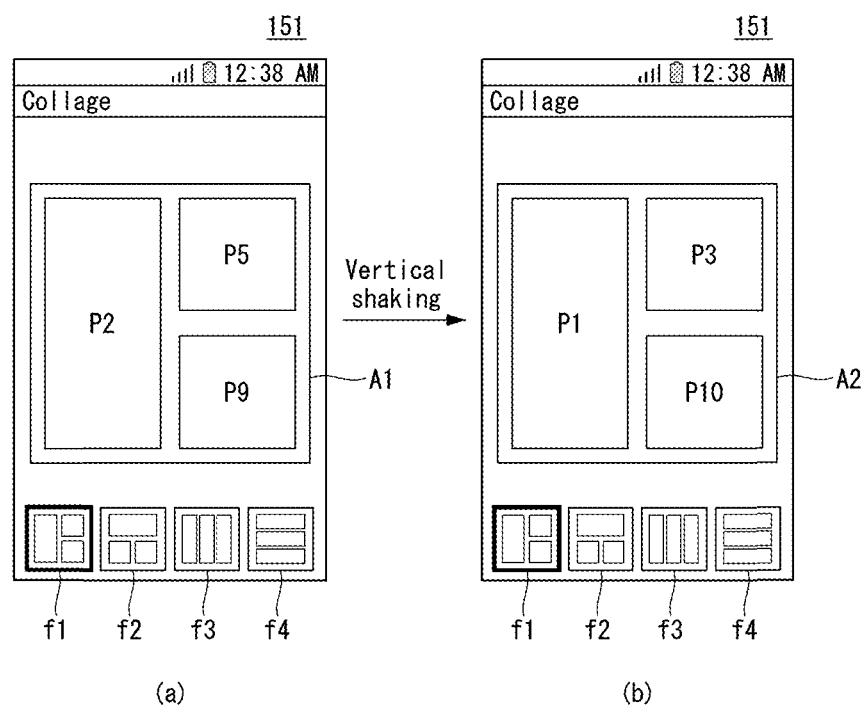
[Figure 17]

[Figure 18]
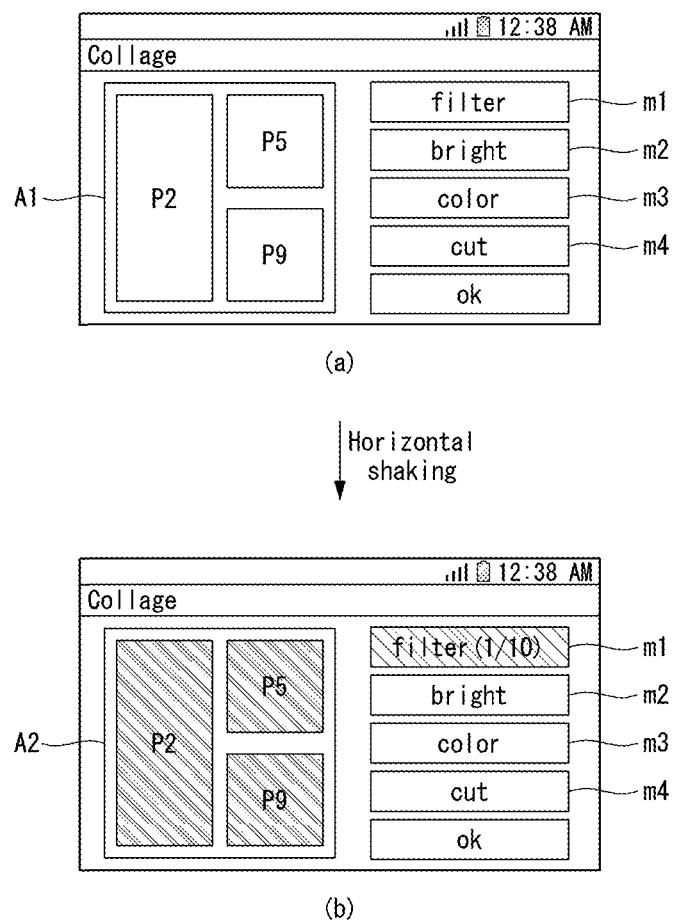

【Figure 19】
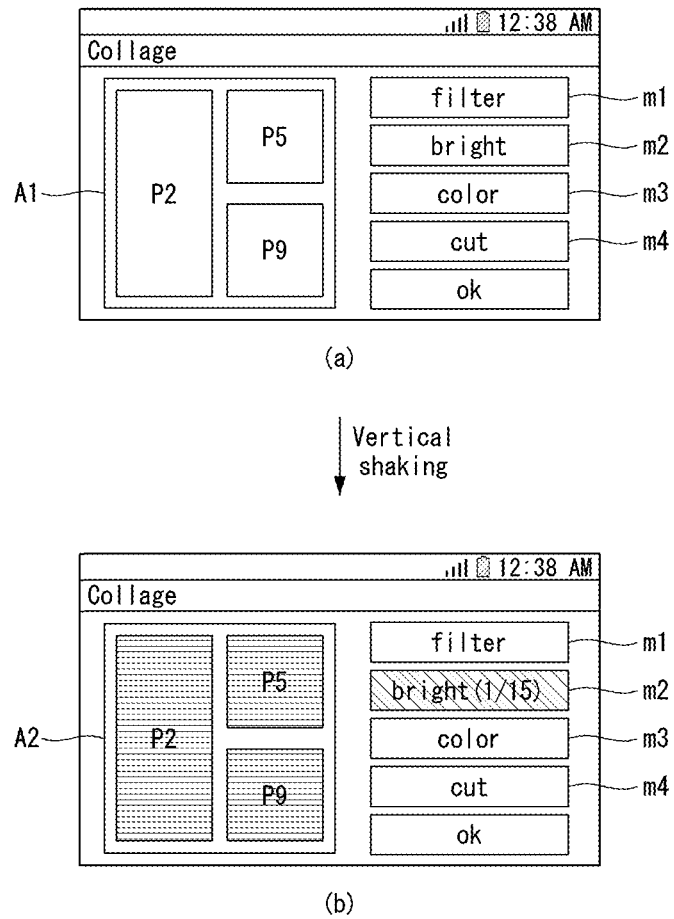
【Figure 20】
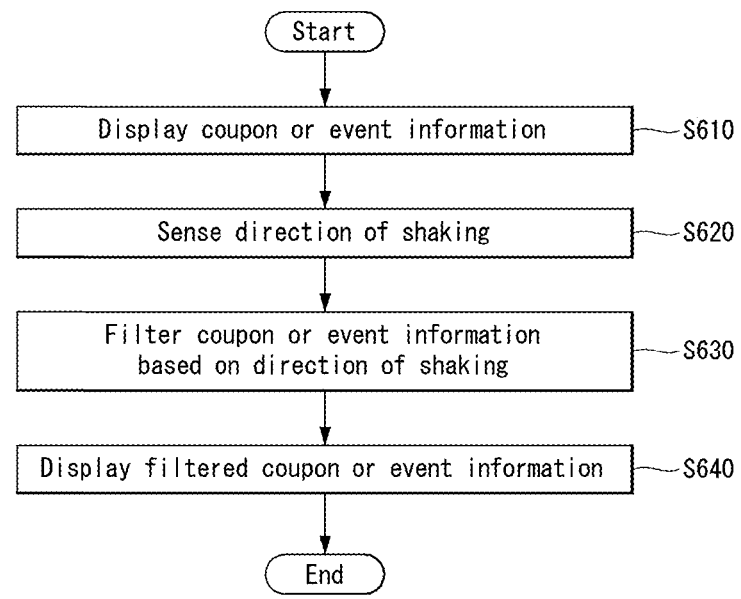

[Figure 21]
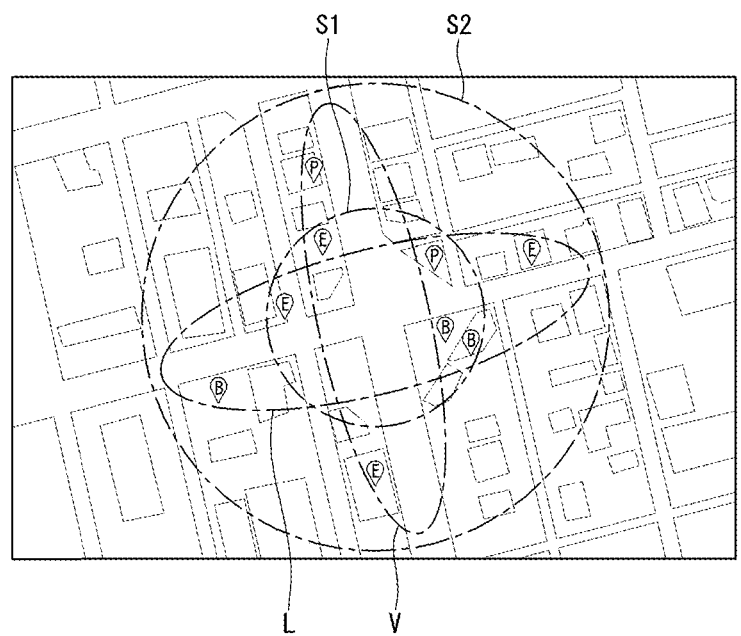

[Figure 22]
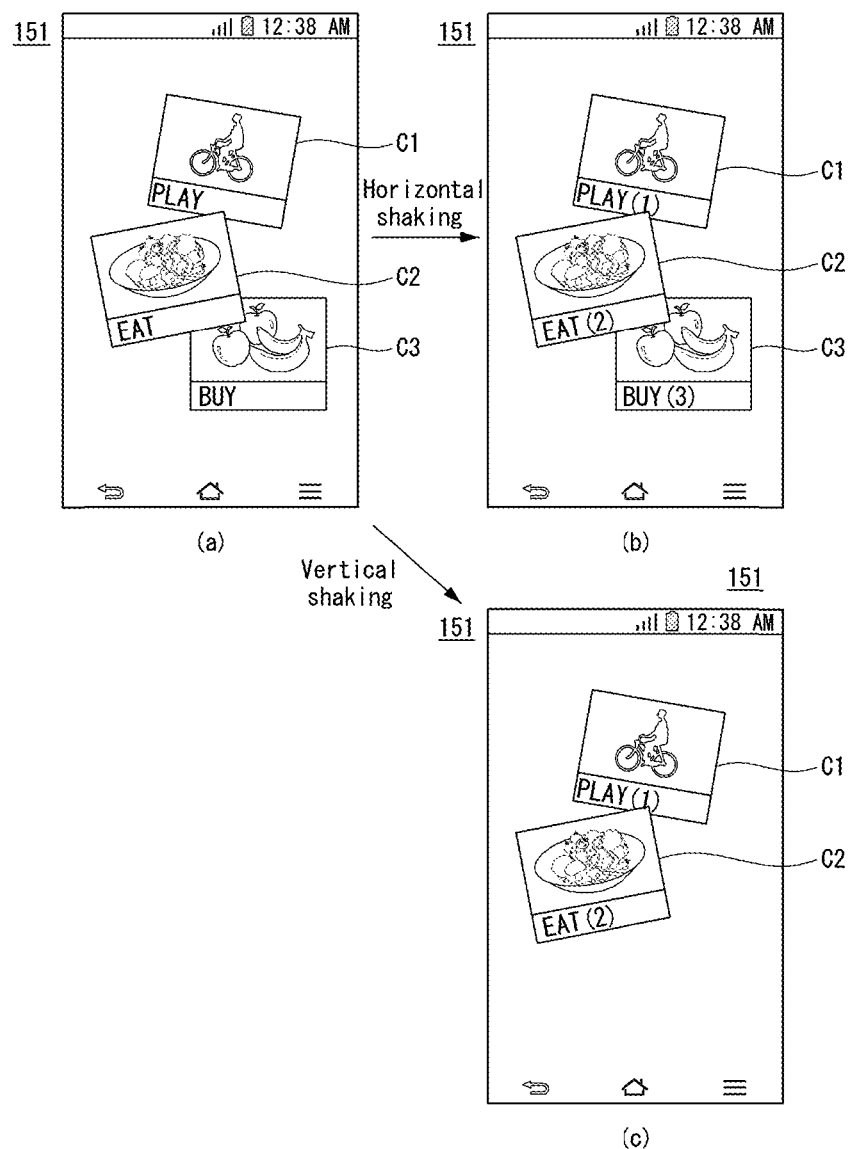

[Figure 23]
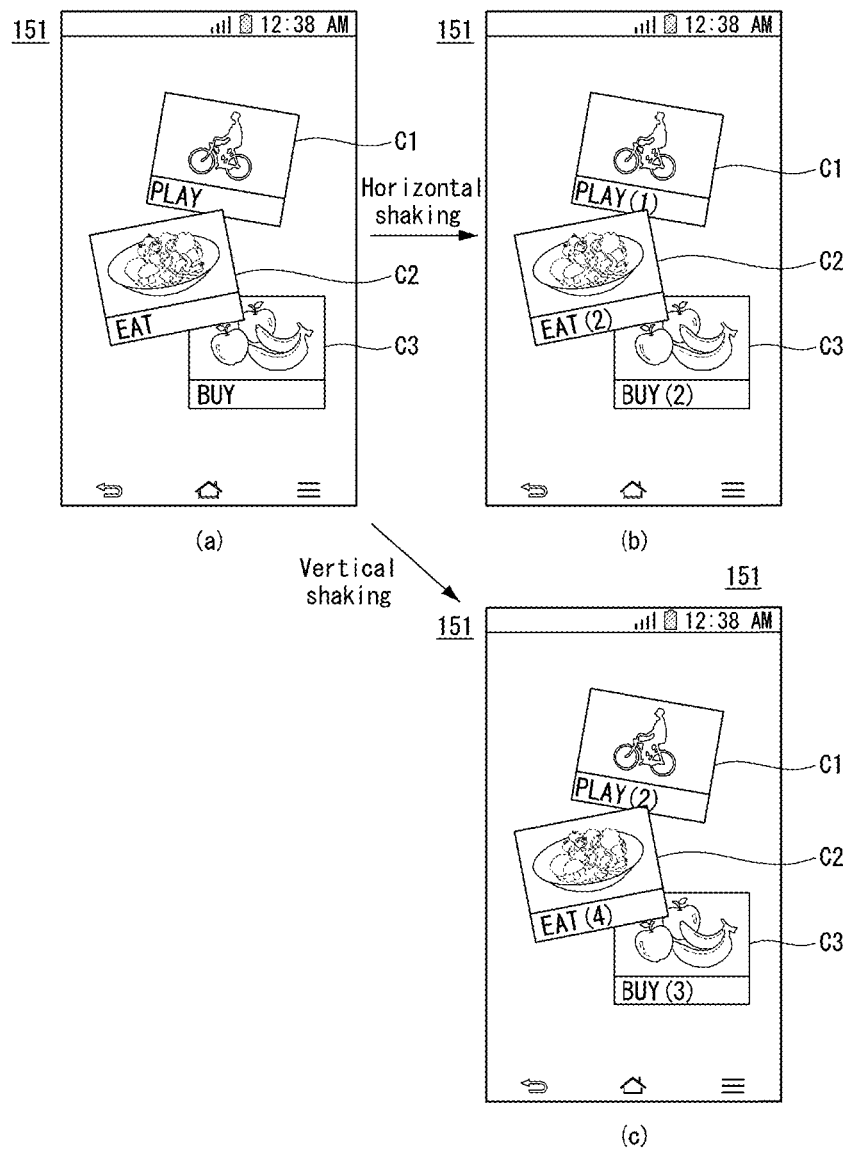

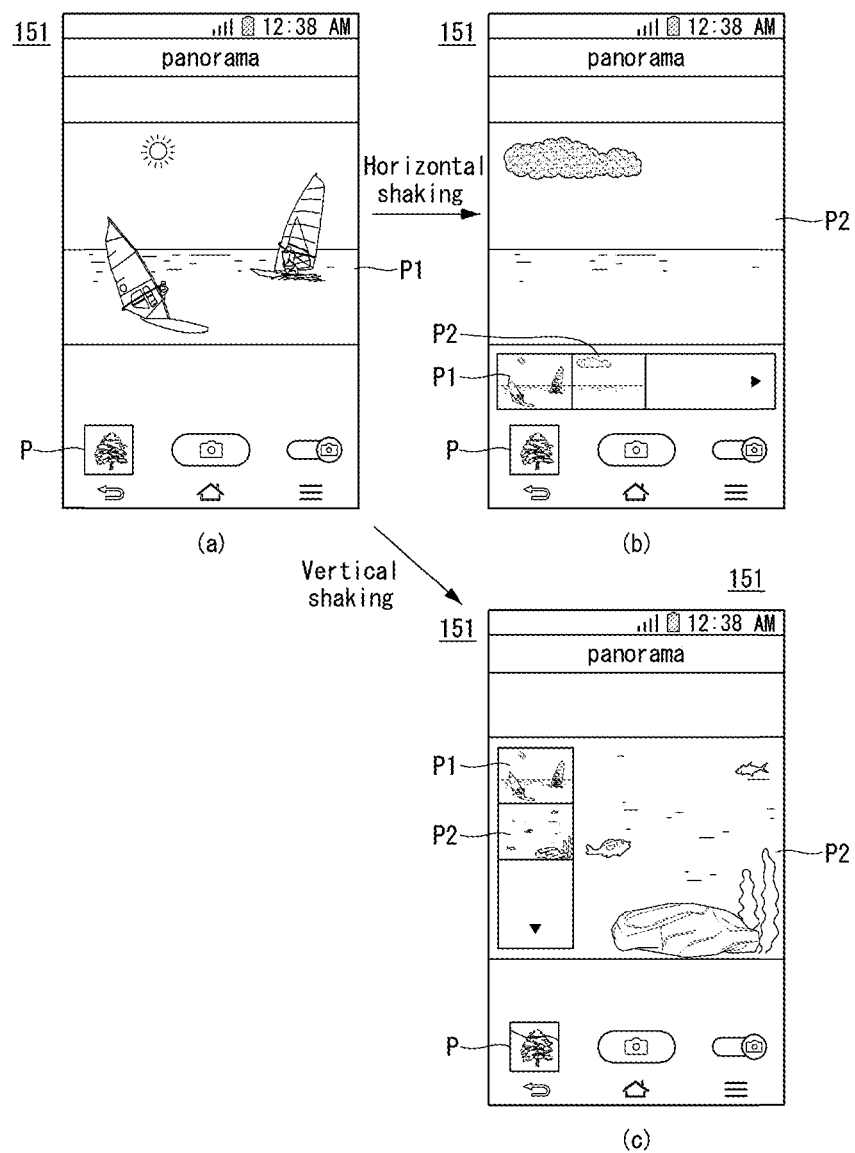
[Figure 24]

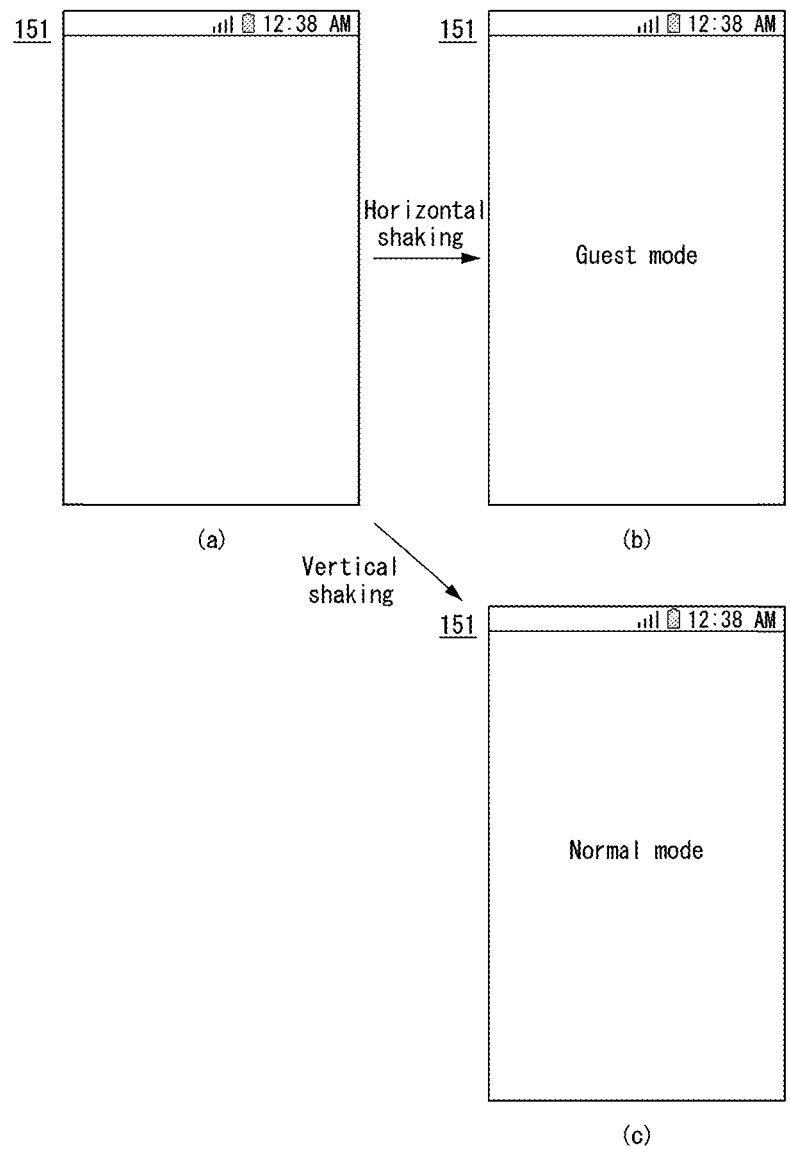
[Figure 25]

[Figure 26]
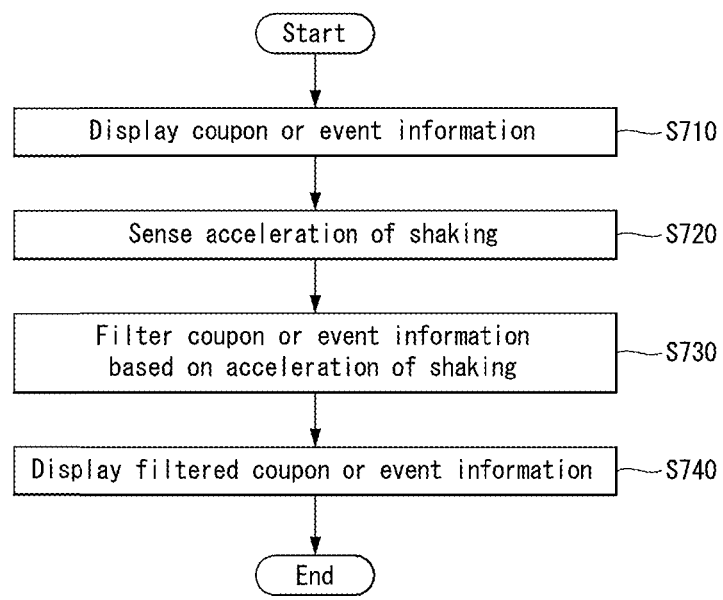

【Figure 27】
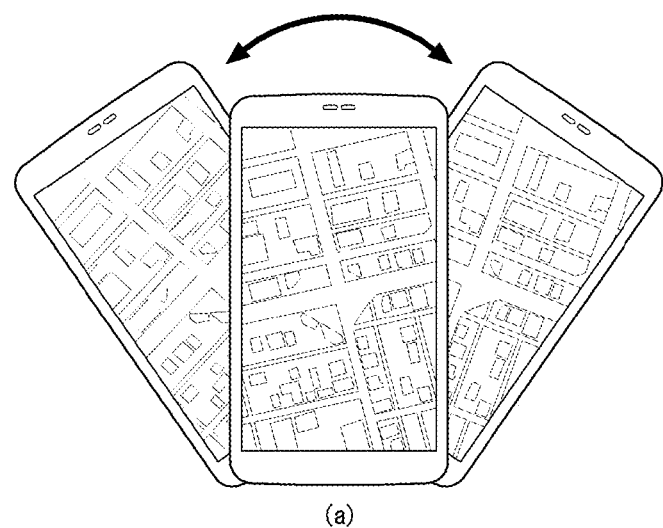
(a)
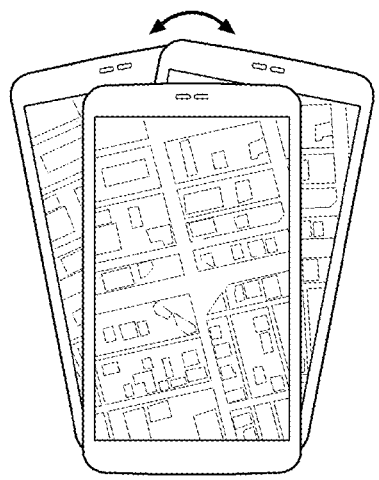
(b)

【Figure 28】
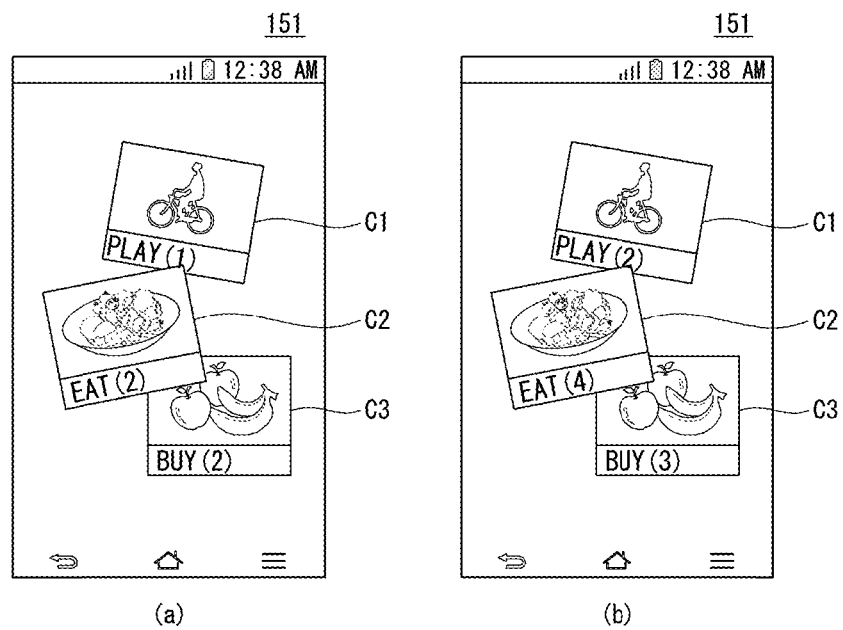

【Figure 29】
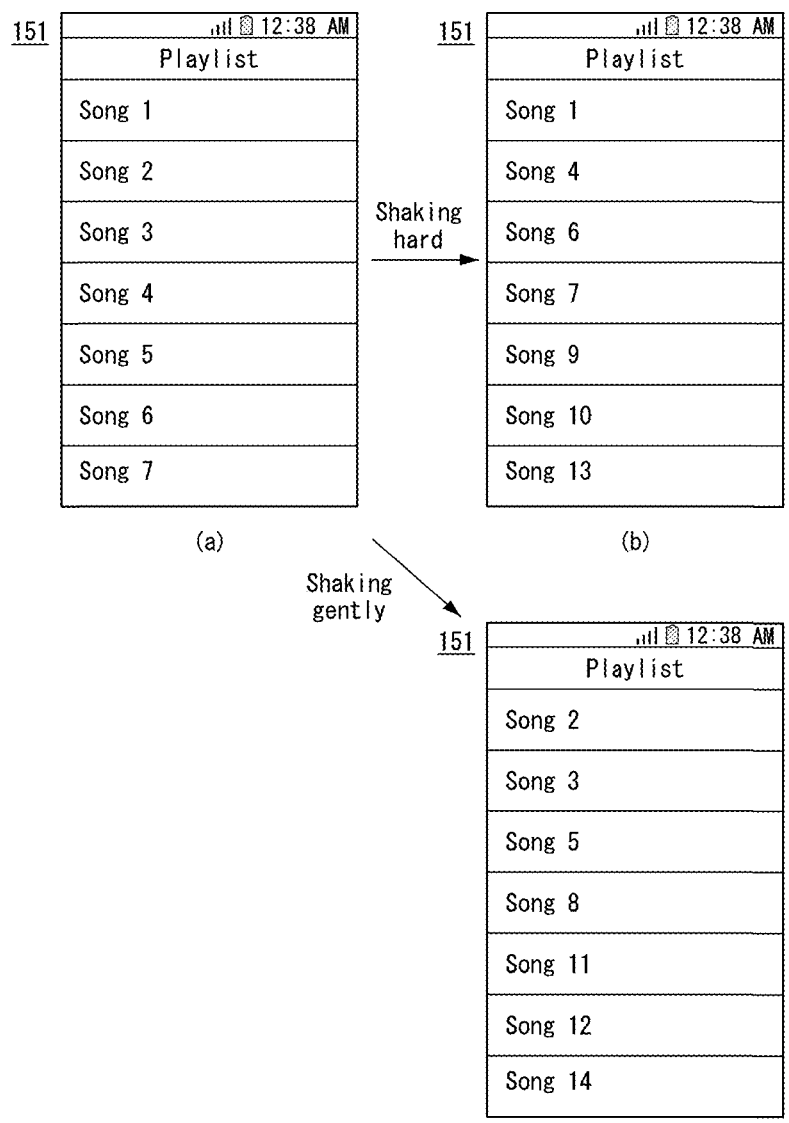

MOBILE TERMINAL AND METHOD FOR CONTROLLING THE SAME

TECHNICAL FIELD

The present invention relates to a mobile terminal which executes various functions by sensing shaking thereof and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Particularly, a terminal includes various sensors capable of sensing information regarding the terminal and researches on methods for providing information for arousing user's interest to the user using information sensed by the sensors are attempted.

DISCLOSURE OF INVENTION

Technical Problem

An object of the present invention is to solve the aforementioned problems and other problems. Another object of the present invention is to provide a mobile terminal which executes a specific function corresponding to at least one shaking operation in consideration of a screen displayed on a display unit, the direction of the shaking operation and the number of times of sensing the shaking operations upon sensing of the at least one shaking operation and displays a result screen of executing the specific function, and a method for controlling the same.

Solution to Problem

According to one aspect of the present invention to accomplish the objects, there is provided to a mobile terminal, including: a sensing unit; a display unit; and a controller configured to execute a specific function corresponding to at least one shaking operation in consideration of a screen displayed on the display unit, a direction of the shaking operation and the number of times of sensing the shaking operation, upon sensing of the shaking operation through the sensing unit, and to control the display unit to display a result screen of executing the specific function.

According to another aspect of the present invention, there is provided a method for controlling a mobile terminal, including: sensing at least one shaking operation; executing a specific function corresponding to the shaking operation in consideration of a screen displayed on a display unit, a direction of the shaking operation and the number of times of sensing the shaking operation; and displaying a result screen of executing the specific function.

Advantageous Effects of Invention

The mobile terminal and the method for controlling the same according to the present invention have the following advantages.

According to at least one embodiment of the present invention, it is possible to arouse user's interest by executing various functions through a shaking operation and displaying a screen resulting from execution of the functions.

In addition, according to at least one embodiment of the present invention, it is possible to display a result screen on the basis of the direction of a shaking operation, the number of times of sensing the shaking operation or the intensity of the shaking operation.

Furthermore, according to at least one embodiment of the present invention, it is possible to selectively execute a function suitable for a specific situation by combining context information acquired from the terminal to generate a result screen corresponding to a shaking operation.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF DRAWINGS

The present invention will become more fully understood from the detailed description given herein below and the accompanying drawings, which are given by illustration only, and thus are not limitative of the present invention, and wherein:

FIG. 1a is a block diagram of a mobile terminal in accordance with the present disclosure.

FIGS. 1b and 1c are conceptual views of one example of the mobile terminal, viewed from different directions.

FIG. 2 is a flowchart illustrating a method for controlling the mobile terminal in accordance with the present disclosure;

FIG. 3 is a view for explaining the method for controlling the mobile terminal in accordance with the present disclosure;

FIG. 4 is a flowchart illustrating a method for controlling the mobile terminal in accordance with a first embodiment of the present disclosure;

FIGS. 5, 6 and 7 are views for explaining the method for controlling the mobile terminal in accordance with the first embodiment of the present disclosure;

FIG. 8 is a flowchart illustrating a method for controlling the mobile terminal in accordance with a second embodiment of the present disclosure;

FIGS. 9 and 10 are views for explaining the method for controlling the mobile terminal in accordance with the second embodiment of the present disclosure;

FIG. 11 is a flowchart illustrating a method for controlling the mobile terminal in accordance with a third embodiment of the present disclosure;

FIGS. 12, 13 and 14 are views for explaining the method for controlling the mobile terminal in accordance with the third embodiment of the present disclosure;

FIG. 15 is a flowchart illustrating a method for controlling the mobile terminal in accordance with a fourth embodiment of the present disclosure;

FIGS. 16 to 19 are views for explaining the method for controlling the mobile terminal in accordance with the fourth embodiment of the present disclosure;

FIG. 20 is a flowchart illustrating a method for controlling the mobile terminal in accordance with a fifth embodiment of the present disclosure;

FIGS. 21 to 25 are views for explaining the method for controlling the mobile terminal in accordance with the fifth embodiment of the present disclosure;

FIG. 26 is a flowchart illustrating a method for controlling the mobile terminal in accordance with a sixth embodiment of the present disclosure; and FIGS. 27, 28 and 29 are views for explaining the method for controlling the mobile terminal in accordance with the sixth embodiment of the present disclosure.

MODE FOR THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being connected with another element, the element can be connected with the other element or intervening elements may also be present. In contrast, when an element is referred to as being directly connected with another element, there are no intervening elements present.

A singular representation may include a plural representation unless it represents a definitely different meaning from the context. Terms such as include or has are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1*a*-1*c*, where FIG. 1*a* is a block diagram of a mobile terminal in accordance with the present disclosure, and FIGS. 1*b* and 1*c* are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1*a*, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1*a*, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1a, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term proximity touch will often be referred to herein to denote the scenario in which a pointer is positioned to be proximate to the touch screen without contacting the touch screen. The term contact touch will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an identifying device) may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an array camera. When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject.

As shown in FIG. 1b, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Embodiments of the present invention will now be described.

FIG. 2 is a flowchart illustrating a method for controlling the mobile terminal in accordance with the present invention and FIG. 3 is a view for explaining the method for controlling the mobile terminal in accordance with the present invention.

Referring to FIG. 2, the controller (180 of FIG. 1a) of the mobile terminal may sense at least one shaking operation through the sensing unit (140 of FIG. 1a) included in the mobile terminal (S110).

The controller may recognize a specific motion of the mobile terminal as shaking using a sensing signal sensed by the sensing unit. Specifically, the controller may recognize a motion in a specific pattern of the mobile terminal, instead of a random motion, as shaking. For example, the controller can recognize a motion of the terminal along a specific trajectory in a predetermined time, as shaking.

The sensing unit may include at least one of an acceleration sensor, a magnetic sensor, a G-sensor, a gyroscope sensor and a motion sensor. The controller may recognize shaking using a sensing signal obtained through each sensor and determine the direction of shaking, the intensity of shaking, the number of times of sensing shaking, etc.

The controller (180 of FIG. 1a) may execute a specific function corresponding to the at least one shaking operation in consideration of a screen displayed on the display unit (151 of FIG. 1a), the direction of the shaking operation and the number of times of sensing the shaking operation (S130) and display a result screen from execution of the specific function on the display unit (151 of FIG. 1a) (S150).

The specific function may include at least one of a function of providing coupon or event information, a function of executing a launcher application, a function of generating a collage album, a function of managing installed applications, a function of editing at least part of an image displayed on the display unit, such as copying, aligning and storing the at least part of the image, a function of generating and uploading a collage album and a function of changing an execution mode of the terminal.

Upon sensing of shaking, the controller may determine a specific function to be executed in consideration of at least one of an image displayed on the display unit, the direction of shaking and the number of times of sensing shaking. In addition, the controller may determine a specific function to be executed using two or more of the image displayed on the display unit, the direction of shaking and the number of times of sensing shaking.

Specifically, the controller may execute different functions when an image displayed on the display unit corresponds to a specific application execution screen, a home screen and a lock screen, respectively. In addition, when the image displayed on the display unit corresponds to a specific application execution screen, the controller may execute a specific function on the basis of application type or an image of the specific application execution screen, which is currently displayed on the display unit.

The controller may determine different functions to be executed when the direction of shaking is horizontal and vertical. In addition, the controller may determine a function to be executed in consideration of the image displayed on the display unit and the direction of shaking. The controller may execute the function depending on the number of times of sensing shaking. The aforementioned methods of determining a specific function to be executed are exemplary and can be implemented in various manners.

The controller may display a screen resulting from execution of the specific function on the display unit. When the screen resulting from execution of the specific function is displayed and shaking is additionally sensed, the controller may determine a specific function to be newly executed in consideration of both the screen resulting from execution of the specific function and the type of shaking. Here, the controller may initialize the number of times of sensing shaking when the shaking direction is changed.

The controller may guide a method of using the specific function by displaying the execution screen of the specific function corresponding to the shaking operation on the display unit for intuitive use of the specific function.

The controller may determine the corresponding specific function by further considering other factors in addition to the aforementioned factors.

When a specific input applied to a specific item included in the image displayed on the display unit is received and shaking is sensed through the sensing unit, the controller may determine the corresponding specific function by further considering the specific input.

The controller may determine the corresponding specific function in consideration of whether the display mode of the display unit is a landscape display mode or a portrait display mode.

The controller may determine the corresponding specific function on the basis of the intensity of shaking, that is, the average acceleration sensed by the sensing unit. Specifically, the controller may determine the corresponding specific function by further considering whether the average acceleration of shaking is greater than or less than a reference value.

Referring to FIG. 3, upon sensing of shaking through the sensing unit (140 of FIG. 1a), the controller (180 of FIG. 1a) may execute a specific function corresponding to shaking and display a screen resulting from execution of the specific function on the display unit (151 of FIG. 1a).

When the specific function corresponding to shaking corresponds to a function of providing coupon or event information, a function of executing a launcher application or a function of generating a collage album, the controller may display the execution screen of each function on the display unit.

Specifically, the controller may set the specific function corresponding to shaking as the function of providing coupon or event information. Upon sensing of shaking, the controller may display the coupon or event information (C1, C2 and C3). Upon sensing of shaking when the display unit is in a lock screen state, the controller may display the coupon or event information C1, C2 and C3 on a lock screen. Upon sensing of shaking when the display unit displays a home screen, the controller may display the coupon or event information C1, C2 and C3 on the home screen.

In addition, upon sensing of shaking while the display unit is turned off, the controller may turn on the display unit and then display the coupon or event information C1, C2 and C3 on the lock screen or home screen. The controller may recommend coupon or event information related to at least one of the time when shaking is sensed and the position of the mobile terminal. That is, upon sensing of shaking in one of the lock screen state, home screen state and display off state, the controller may display coupon or event information related to one of the time when shaking is sensed and the position of the mobile terminal. When shaking is continuously sensed, the controller may change and recommend coupon or event information each time shaking is sensed.

Alternatively, the controller may set the specific function corresponding to shaking as a function of changing a wallpaper and icons. Upon sensing of shaking, the controller may change the wallpaper to a wallpaper of a set subject BG and change font, sound, utility applications I1 to I4 and widgets g1 and g2 according to setting. Upon sensing of shaking in one of the lock screen state, home screen state and display off state, the controller may change the wallpaper and icons according to setting. The controller may change the wallpaper to a wallpaper and icons related to at least one of the time when shaking is sensed and the position of the mobile terminal. The controller may change and display the wallpaper and icons each time shaking is sensed.

For example, when shaking is sensed at 9 PM, the controller can recommend a wallpaper and icons related to night.

The controller may set the specific function corresponding to shaking as the function of generating a collage album. The controller may randomly select N images and an album frame and generate a collage album upon sensing of shaking. The controller may generate different collage albums whenever shaking is sensed. The controller may generate a collage album upon sensing of shaking when a gallery application is executed or the gallery application is selected. In addition, the controller may select N images P1, P2 and P3 stored in the gallery application, display the N images P1, P2 and P3 in a first area of the display unit and display selectable album frames f1 to f5 in a second area of the display unit. The controller may generate a collage album A1 using a frame f1 selected by the user and display the collage album A1 on the display unit 151. That is, the controller may randomly generate a collage album and display the generated collage album on the display unit or display a guide screen through which the user can select images and a frame for generating a collage album, upon sensing of shaking. The controller may set the specific function corresponding to shaking randomly or according to user's choice.

The controller may execute various functions other than the aforementioned specific function, such as a function of managing applications installed in the mobile terminal, a function of editing an image displayed on the display unit and a function of changing an execution mode of the mobile terminal, according to shaking.

FIG. 4 is a flowchart illustrating a method for controlling the mobile terminal according to a first embodiment of the present invention and FIGS. 5, 6 and 7 are views for explaining the method for controlling the mobile terminal according to the first embodiment of the present invention. The first embodiment corresponds to a case in which a collage album is generated in response to shaking.

Referring to FIG. 4, the controller (180 of FIG. 1a) of the mobile terminal may execute the gallery application and display the gallery application execution screen on the display unit (151 of FIG. 1a) (S210).

Upon sensing of shaking of the mobile terminal (S220), the controller (180 of FIG. 1*a*) may generate a collage album using images stored in the gallery application (S230).

When the number of times of sensing shaking is N, the controller may select N images from images stored in the gallery application and select a frame for arranging the N images to generate a collage album. The controller may randomly select N images from the images stored in the gallery application or select N images related to at least one of the time when shaking is sensed and the position of the mobile terminal. In addition, when a plurality of album frames for arranging the N images is present, the controller may select an arbitrary album frame.

The controller (180 of FIG. 1*a*) may display the generated collage album on the display unit (151 of FIG. 1*a*). Upon additional sensing of shaking while the collage album is displayed, the controller may change at least one of the number of images to be selected from the images stored in the gallery application, the frame, image arrangement order and images to be selected on the basis of the number of times of sensing shaking to regenerate a collage album.

Referring to FIG. 5, the controller (180 of FIG. 1*a*) of the mobile terminal may execute the gallery application. When shaking is sensed three times through the sensing unit while images P1 to P2 stored in the gallery application area displayed, the controller may extract N images from the displayed images P1 to P20 to generate a collage album.

Specifically, upon sensing of shaking three times while the gallery application execution screen is displayed, the controller may extract three images P2, P5 and P9 stored in the gallery application and select a specific album frame f1 to generate a collage album A1. Here, the images P2, P5 and P9 and the specific album frame f1 may be selected according to a set rule or randomly.

The controller may change the number of images to be selected on the basis of the number of times of sensing shaking when the gallery application execution screen is displayed.

Referring to FIG. 6, the controller (180 of FIG. 1*a*) of the mobile terminal may extract N images from images stored in a specific folder Folder1 displayed on the display unit 151 to generate a collage album, upon reception of touch input applied to the specific folder Folder1 and sensing of shaking.

Upon reception of touch input applied to Folder1 and sensing of shaking four times, the controller may extract four images from 20 images stored in Folder1 to generate a collage album A1 and store the collage album A1 in Folder1.

Referring to FIG. 7, upon reception of touch input applied to Folder1 displaying the collage album A1 as a representative image and sensing of shaking, the controller (180 of FIG. 1*a*) of the mobile terminal may change the frame of the collage album A1 displayed as a representative image to generate a new collage album A2 and display the new collage album A2.

Specifically, the controller may change the album frame and change arrangement of images P1, P4, P6 and P20 included in the collage album A1 to fit in the changed album frame so as to generate the new collage album A2.

In the same manner, the controller may change the frame of the collage album A2 displayed as a representative image to generate a new collage album upon reception of touch input applied to Folder1 and sensing of shaking.

FIG. 8 is a flowchart illustrating a method for controlling the mobile terminal according to a second embodiment of the present invention and FIGS. 9 and 10 are views for explaining the method for controlling the mobile terminal according to the second embodiment of the present invention. The second embodiment corresponds to a case in which applications are filtered according to a specific condition when shaking is sensed.

Referring to FIG. 8, the controller (180 of FIG. 1*a*) of the mobile terminal may display an execution screen of an application management application on the display unit (151 of FIG. 1*a*) (S310). Upon execution of the application management application, the controller may display a list or icons of applications installed in the mobile terminal on the execution screen.

Upon sensing of shaking N times (S320), the controller may filter installed applications according to a specific standard (S330) and display a list of the filtered applications (S340). The controller may pre-set the specific standard for filtering installed applications on the basis of the number of times of sensing shaking.

Referring to FIG. 9, the controller (180 of FIG. 1*a*) may display a list of installed applications on the display unit 151. Upon sensing of shaking while the application list is displayed, the controller may filter the applications in accordance with the specific standard on the basis of the number of times of sensing shaking.

For example, upon sensing of shaking once, the controller can filter out applications App2, App5, App6 and App12, which are idle for one month, and display the filtered applications on the display unit 151. Upon sensing of shaking twice, the controller can filter applications App5, App12 and App16 idle for two months and display the filtered applications on the display unit 151. Here, two shaking operations may be continuously sensed or a shaking operation may be additionally sensed after the first filtering result obtained according to the first shaking operation is displayed on the display unit.

Referring to FIG. 10, when icons of installed applications are displayed on the execution screen and shaking is sensed, the controller (180 of FIG. 1*a*) may filter applications which have been executed a specific number of times or more and display the filtered applications.

For example, upon sensing of shaking once while application icons are displayed, the controller can filter applications App2, App3, App5, App7, App8. App9, App10 and App11, which have been executed five times or more, and display the filtered applications on the display unit 151. Upon sensing of shaking twice, the controller can filter applications App3, App7, App8, App9 and App11, which have been executed ten times or more, and display the filtered applications on the display unit 151. Here, two shaking operations may be continuously sensed or a shaking operation may be additionally sensed after the first filtering result obtained according to the first shaking operation is displayed on the display unit.

The controller can display a filtering standard according to sensing of shaking using a pop-up window W1 and display the number of times of sensing shaking through the pop-up window W1 so as to provide a guide to the user.

While the controller sets a period in which an installed application is idle or the number of executions of an application as a filtering standard on the basis of the number of times of sensing shaking in the aforementioned embodiment, memory use amount, battery consumption amount and the like may be set as filtering standards.

FIG. 11 is a flowchart illustrating a method for controlling the mobile terminal according to a third embodiment of the present invention and FIGS. 12, 13 and 14 are views for explaining the method for controlling the mobile terminal according to the third embodiment of the present invention.

The third embodiment corresponds to a case in which coupon or event information is provided upon sensing of shaking.

Referring to FIG. 11, the controller (180 of FIG. 1*a*) of the mobile terminal may display a lock screen on the display unit (151 of FIG. 1*a*) (S410). Upon sensing of shaking N times (S420), the controller may filter coupon or event information (S430) and display the filtered coupon or event information on the display unit (S440).

When the display unit is turned off and shaking is sensed through the sensing unit, the controller may turn on the display unit and display coupon or event information on the lock screen. Upon sensing of shaking, the controller may execute a function of providing coupon or event information in the background and display coupon or event information on the lock screen of the display unit. The controller may filter coupon or event information to be recommended using at least one of the time when shaking is sensed and the position of the mobile terminal.

Referring to FIG. 12, upon sensing of shaking when the display unit is in a lock screen state, the controller (180 of FIG. 1*a*) may display coupon or event information C1, C2 and C3 on the lock screen of the display unit 151.

Upon selection of the coupon or event information C1, C2 and C3, the controller may filter the coupon or event information C1, C2 and C3 related to the time when shaking is sensed and the position of the mobile terminal using the time or position and provide the filtered coupon or event information.

The controller may determine the number of categories of coupons or events to be displayed, on the basis of the number of times of sensing shaking. For example, upon sensing of shaking three times, the controller can provide coupons or events in three categories, PLAY (C1), EAT (C2) and BUY (C3).

Referring to FIG. 13, upon display of the home screen on the display unit 151 and sensing of shaking, the controller (180 of FIG. 1*a*) may execute the launcher application to change the subject BG of a wallpaper, utility applications I1 to I4 and widgets g1 and g2 displayed on the home screen, font and sound related to the home screen according to a first standard.

Upon additional sensing of shaking, the controller may re-execute the launcher application to change the subject BG of the wallpaper, utility applications I1 to I4 and widgets g1 and g2 displayed on the home screen, font and sound related to the home screen according to a second standard.

Accordingly, the user can easily change the subject of display, sound, font, icons and the like by shaking the mobile terminal with the home screen displayed.

Referring to FIG. 14, the controller (180 of FIG. 1*a*) may display an execution screen of a search related application. Upon sensing of shaking, the controller may execute a function of editing at least part of an image displayed on the display unit.

Upon sensing of shaking while the search related application execution screen is displayed, the controller may select content of a specific region and display an editing menu through a pop-up window W1. Upon additional sensing of shaking, the controller may change the selected content to the entire region and display the editing menu through the pop-up window W1. Upon additional sensing of shaking when the entire region is selected, the controller may copy the selected entire region, store the copied region in a memo pad and display the content stored in the memo pad in a region W of the display unit 151.

FIG. 15 is a flowchart illustrating a method for controlling the mobile terminal according to a fourth embodiment of the present invention and FIGS. 16 to 19 are views for explaining the method for controlling the mobile terminal according to the fourth embodiment of the present invention. The fourth embodiment corresponds to a case in which a specific function is executed on the basis of a direction of shaking.

Referring to FIG. 15, the controller (180 of FIG. 1*a*) of the mobile terminal may display a collage album (S510), edit the collage album (S530) on the basis of a direction of shaking (S520) and display the edited collage album on the display unit (S540).

As described above, the controller may generate a collage album upon sensing of shaking while the gallery application execution screen is displayed. In addition, the controller may generate a collage album by selecting a specific image and a specific frame according to user's choice.

Upon sensing of shaking while the collage album is displayed, the controller may change at least one of images, frame and image arrangement of the collage album on the basis of the direction of shaking to generate a new collage album.

Referring to FIG. 16, upon sensing of shaking while a collage album A1 is displayed in portrait mode on the display unit 151, the controller may change the frame of the collage album A1 to generate a new collage album A2.

The controller may display the collage album A1 composed of three images P2, P5 and P9 and a frame f1 on the display unit 151. The controller may display the collage album A1 in a first area of the display unit 151 and display a plurality of frames f1 to f4 in a second area of the display unit 151.

The controller may change the frame of the collage album A1 to generate the new collage album A2 when the direction of shaking is horizontal. The controller may determine the frame of the collage album on the basis of the number of times of sensing shaking. Upon additional sensing of horizontal shaking while the new collage album A2 is displayed, the controller may change the frame of the collage album.

Referring to FIG. 17, upon sensing of vertical shaking while the collage album A1 is displayed in portrait mode on the display unit 151, the controller (180 of FIG. 1) may change the images to generate the new collage album A2.

The controller may display the collage album A1 composed of the three images P2, P5 and P9 and frame 1 on the display unit 151. The controller may display the collage album A1 in the first area of the display unit 151 and display the plurality of frames f1 to f4 in the second area of the display unit 151.

The controller may change the images P2, P5 and P9 of the collage album A1 to images P1, P3 and P10 to generate a new collage album A2 when the direction of shaking is vertical. The controller may determine the images of the collage album on the basis of the number of times of sensing shaking according to a set rule. Upon additional sensing of vertical shaking while the new collage album A2 is displayed, the controller may change the images of the collage album to other images.

Referring to FIG. 18, upon sensing of horizontal shaking while the collage album A1 is displayed in landscape mode on the display unit 151, the controller (180 of FIG. 1*a*) may change the level of a selected editing menu to generate a new collage album A2.

The controller may display the collage album A1 composed of the three images P2, P5 and P9 and frame f1 in a first area of the display unit 151 and display a plurality of editing menus m1 to m4 in a second area of the display unit 151.

When the direction of shaking is horizontal, the controller may change the level of a selected editing menu m1 and edit the collage album A1 to generate the new collage album A2. The controller may additionally change the level of the selected editing menu on the basis of the number of times of sensing horizontal shaking to generate a new collage album.

Referring to FIG. 19, upon sensing of vertical shaking while the collage album A1 is displayed in landscape mode on the display unit 151, the controller (180 of FIG. 1*a*) may change the selected editing menu and generate a new collage album A2 to which the changed editing menu is applied.

The controller may display the collage album A1 composed of the three images P2, P5 and P9 and frame f1 in the first area of the display unit 151 and display the plurality of editing menus m1 to m4 in the second area of the display unit 151.

When the direction of shaking is vertical, the controller may change the selected editing menu m1 to another editing menu m2 and apply the changed editing menu m2 to the collage album A1 to generate the new collage album A2. The controller may change the changed editing menu to another editing menu on the basis of the number of times of sensing vertical shaking. In addition, upon sensing of horizontal shaking after the editing menu is changed, the controller may additionally change the level of the changed editing menu and generate a new collage album to which the changed editing menu is applied.

Accordingly, the user can determine a collage album display direction and generate a collage album with a desired frame, images, filter, brightness, color and the like by shaking the mobile terminal in the horizontal or vertical direction when the collage album is displayed.

FIG. 20 is a flowchart illustrating a method for controlling the mobile terminal according to a fifth embodiment of the present invention and FIGS. 21 to 25 are views for explaining the method for controlling the mobile terminal according to the fifth embodiment of the present invention. The fifth embodiment corresponds to a case in which a specific function is executed on the basis of the intensity of shaking.

Referring to FIG. 20, upon sensing of shaking while coupon or event information is displayed on the display unit (151 of FIG. 1*a*) (S610), the controller (180 of FIG. 1*a*) may sense the direction of shaking (S620).

The controller (180 of FIG. 1*a*) may filter the coupon or event information on the basis of the direction of shaking according to a specific standard and provide the filtered coupon or event information (S630 and S640).

Referring to FIGS. 21, 22 and 23, the controller (180 of FIG. 1*a*) may filter coupon or event information related to specific position information on the basis of the current position of the mobile terminal according to the direction of shaking.

Referring to FIG. 21, it is assumed that the user of the mobile terminal is located at the center (referred to as "the current position of the mobile terminal") of concentric circles S1 and S2 and sees the upper part of the display unit.

The controller may display coupon or event information corresponding to an area within a predetermined radius S2 on the display unit using the current position of the mobile terminal upon sensing of shaking.

Referring to FIG. 22 the controller (180 of FIG. 1*a*) may filter coupon or event information related to horizontal position information or coupon or event information related to vertical position information on the basis of the current position of the mobile terminal and provide the filtered coupon or event information, upon sensing of horizontal or vertical shaking.

Specifically, the controller may filter coupon or event information PLAY(1), EAT(2) and BUY(3) related to position information of area L and display the filtered coupon or event information on the display unit upon sensing of horizontal shaking at the current position of the mobile terminal. The controller may filter coupon or event information PLAY(1) and EAT(2) related to position information of area V and display the filtered coupon or event information on the display unit upon sensing of vertical shaking at the current position of the mobile terminal.

Referring to FIG. 23, the controller (180 of FIG. 1*a*) may filter coupon or event information related to position information of an area S1 within a first radius or an area S2 within a second radius on the basis of the current position of the mobile terminal and provide the filtered coupon or event information, upon sensing of horizontal or vertical shaking.

Specifically, the controller may filter coupon or event information PLAY(1), EAT(2) and BUY(3) related to position information of area S1 and display the filtered coupon or event information on the display unit upon sensing of horizontal shaking at the current position of the mobile terminal. The controller may filter coupon or event information PLAY(2), EAT(4) and BUY(3) related to position information of area S2 and display the filtered coupon or event information on the display unit upon sensing of vertical shaking at the current position of the mobile terminal.

Referring to FIG. 24, upon sensing of shaking in a camera mode, the controller (180 of FIG. 1*a*) may change camera setting to a landscape panorama mode or a portrait panorama mode on the basis of the direction of shaking.

Upon sensing of horizontal shaking when the camera mode is set and a preview image P1 is displayed on the display unit 151, the controller may change camera setting to the landscape panorama mode and generate landscape panorama images P1 and P2 according to movement of the camera.

Upon sensing of vertical shaking when the camera mode is set and the preview image P1 is displayed on the display unit 151, the controller may change camera setting to the portrait panorama mode and generate portrait panorama images P1 and P2 according to movement of the camera.

Referring to FIG. 25, upon sensing of shaking while the display unit (151 of FIG. 1*a*) is turned off, the controller (180 of FIG. 1*a*) may set an operation mode to a guest mode or a normal mode on the basis of the direction of shaking.

Specifically, the controller may enter the guest mode upon sensing of horizontal shaking and release of the lock screen when the display unit is turned off. The controller may enter the normal mode upon sensing of vertical shaking and release of the lock screen when the display unit is turned off.

FIG. 26 is a flowchart illustrating a method for controlling the mobile terminal according to a sixth embodiment of the present invention and FIGS. 27, 28 and 29 are views for explaining the method for controlling the mobile terminal according to the sixth embodiment of the present invention.

Referring to FIG. 26, the controller (180 of FIG. 1*a*) of the mobile terminal may display a screen related to coupon or event information on the display unit (151 of FIG. 1*a*) (S710) and sense shaking.

Upon sensing of shaking, the controller may sense acceleration of shaking (S720), filter coupon or event information on the basis of the sensed acceleration and display the filtered coupon or event information (S730 and S740).

Referring to FIG. 27, the controller (180 of FIG. 1a) may display an area for which coupon or event information is provided on the display unit 151 on the basis of the current position of the mobile terminal and sense shaking.

The controller may compare the average acceleration of shaking with a reference value and divide the intensity of shaking into high intensity and low intensity.

Referring to FIG. 28, the controller (180 of FIG. 1a) may set reference position information for filtering coupon or event information on the basis of the intensity of shaking.

Specifically, the controller may filter coupon or event information PLAY(1), EAT(2) and BUY(2) related to the position information of the area (S1 of FIG. 21) within the first radius and provide the filtered coupon or event information when the intensity of shaking is low. The controller may filter coupon or event information PLAY(2), EAT(4) and BUY(3) related to the position information of the area (S2 of FIG. 21) within the second radius and provide the filtered coupon or event information when the intensity of shaking is high.

Referring to FIG. 29, when an execution screen of a music play application is executed and shaking is sensed, the controller (180 of FIG. 1a) may filter music files included in a playlist and display the filtered music files on the basis of the intensity of shaking.

Specifically, the controller may filter a music file having a beat per minute, which is higher than a predetermined value, which is included in the playlist, and display the filtered music file on the display unit 151 when the intensity of shaking is high. The controller may filter a music file having a beat per minute, which is lower than the predetermined value, which is included in the playlist, and display the filtered music file on the display unit 151 when the intensity of shaking is low.

According to the present invention, it is possible to operate the mobile terminal through a simple method and to arouse user's interest by executing various functions depending on various types of shaking and providing screens resulting from execution of the functions.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal, comprising:
   a sensor;
   a display; and
   a controller operably coupled to the sensor and the display, and configured to:
      control the display to display an execution screen of a gallery application, the execution screen including a plurality of images associated with the gallery application;
      select images among the plurality of images in response to a first shaking operation sensed through the sensor, wherein a number of the images selected randomly corresponds to a number of times the mobile terminal is shaken during the first shaking operation;
      generate a collage album by arranging the randomly selected images according to a first frame;
      control the display to display the collage album; and
      change the first frame to a second frame or change the images included in the collage album to other images among the plurality of images based on a direction of a second shaking operation detected while the collage album is displayed according to the first frame such that:
         the first frame is changed to the second frame when the second shaking operation occurs in a first direction; and
         the images included in the collage album are changed to other images among the plurality of images when the second shaking operation occurs in a second direction.

2. The mobile terminal of claim 1, wherein the same images included in the collage album are rearranged according to the second frame when the first frame is changed to the second frame in response to the second shaking operation in the first direction.

3. The mobile terminal of claim 1, wherein the controller is further configured to:
   execute a specific function corresponding to at least one shaking operation in consideration of a screen displayed on the display, a direction of the shaking operation, and a number of times of sensing the shaking operation;
   recognize a specific input applied to a specific item included in the screen and sense the shaking operation through the sensor; and
   determine the specific function based on further considering the specific input.

4. The mobile terminal of claim 3, wherein the controller is further configured to determine the specific function based on further considering whether a display mode of the display is a landscape display mode or a portrait display mode.

5. The mobile terminal of claim 3, wherein the controller is further configured to determine the corresponding specific function based on further considering whether an average value of acceleration of the shaking operation is greater than or less than a reference value.

6. The mobile terminal of claim 1, wherein the collage album is continuously displayed according to the first frame when the images included in the collage album are changed to the other images among the plurality of images in response to the second shaking operation in the second direction.

7. The mobile terminal of claim 1, wherein the controller is further configured to discriminate the direction of the second shaking operation into a horizontal direction and a vertical direction on the basis of shaking trajectory of the mobile terminal.

8. The mobile terminal of claim 1, wherein:
the first direction is a horizontal direction; and
the second direction is a vertical direction.

9. The mobile terminal of claim 1, wherein the controller is further configured to control the display to display graphic objects representing a plurality of frames when the collage album is displayed according to the first frame.

10. The mobile terminal of claim 9, wherein the controller is further configured to control the display to display a graphic object corresponding to the first frame distinguishably among the graphic objects when the collage album is displayed according to the first frame.

11. The mobile terminal of claim 10, wherein the controller is further configured to control the display to display a graphic object corresponding to the second frame distinguishably among the graphic objects when the collage album is displayed according to the second frame.

12. The mobile terminal of claim 1, wherein the controller is further configured to select images related to at least one of time when the first shaking operation is sensed or a position of the mobile terminal to generate the collage album.

13. The mobile terminal of claim 1, wherein the controller is further configured to control the display to display one of a plurality of frames or a plurality of editing menus along with the generated collage album according to a display mode of the generated collage album.

14. The mobile terminal of claim 1, wherein at least one of the other images displayed when the second shaking operation occurs in the second direction is an image that was not previously included in the collage album prior to the detection of the second shaking operation.

15. The mobile terminal of claim 13, wherein, when a specific editing menu is selected from the plurality of editing menus and a third shaking operation is sensed, the controller is further configured to control the display to display a collage album obtained by editing the generated collage album using the specific editing menu.

16. The mobile terminal of claim 1, wherein the controller is further configured to:
generate the collage album in a background; and
control the display to display the collage album on a lock screen of the display when the display is turned off and the first shaking operation is sensed through the sensor.

17. A method for controlling a mobile terminal, comprising:
causing a display to display an execution screen of a gallery application, the execution screen including a plurality of images associated with the gallery application;
sensing a first shaking operation via a sensor;
selecting images among the plurality of images in response to a first shaking operation, wherein a number of the images selected randomly corresponds to a number of times the mobile terminal is shaken during the first shaking operation;
generating a collage album by arranging the selected images according to a first frame;
causing the display to display the collage album; and
changing the first frame to a second frame or changing the images included in the collage album to other images among the plurality of images based on a direction of a second shaking operation detected while the collage album is displayed according to the first frame such that:
the first frame is changed to the second frame when the second shaking operation occurs in a first direction; and
the images included in the collage album are changed to other images among the plurality of images when the second shaking operation occurs in a second direction.

* * * * *